United States Patent [19]

Kujas

[11] Patent Number: 4,657,827

[45] Date of Patent: Apr. 14, 1987

[54] HYDROGEN-OXYGEN FUEL CELL AND METHOD FOR GENERATING ELECTRICITY IN SAID FUEL CELL

[75] Inventor: Erich F. Kujas, Philadelphia, Pa.

[73] Assignee: RCA Corporation, Princeton, N.J.

[21] Appl. No.: 834,390

[22] Filed: Feb. 28, 1986

[51] Int. Cl.⁴ .............................................. H01M 8/22
[52] U.S. Cl. ........................................ 429/12; 429/13
[58] Field of Search ..................................... 429/12, 13

[56] References Cited

U.S. PATENT DOCUMENTS

| | | | |
|---|---|---|---|
| 3,382,103 | 5/1968 | Smith | 136/86 |
| 3,425,873 | 2/1969 | Worsham et al. | 429/13 |
| 3,506,494 | 4/1970 | Adlhart | 136/86 |
| 3,546,019 | 12/1970 | Von Doehren et al. | 136/86 |
| 3,553,028 | 1/1971 | Matsuda | 136/86 |
| 3,607,420 | 9/1971 | Cutler | 429/13 |
| 3,657,015 | 4/1972 | Veatch et al. | 136/83 R |
| 4,218,518 | 8/1980 | Vaseen | 429/14 |
| 4,493,878 | 1/1985 | Horiba et al. | 429/12 |

FOREIGN PATENT DOCUMENTS 0971454  9/1964  United Kingdom ................. 429/13

Primary Examiner—Donald L. Walton
Attorney, Agent, or Firm—Birgit E. Morris; Donald S. Cohen; Bernard F. Plantz

[57] ABSTRACT

A hydrogen-oxygen fuel cell is provided which includes as the fuel a mixture comprised of about 40 to 60% by volume of formaldehyde and about 60 to 40% by volume of propionaldehyde. The operation of hydrogen-oxygen fuel cells is improved with regard to the amount of electrical power produced, the length of time of operation between discharges of the hydrogen-oxygen fuel cell and the number of times the hydrogen-oxygen fuel cell can be rejuvenated before replacement of electrolyte.

6 Claims, 3 Drawing Figures

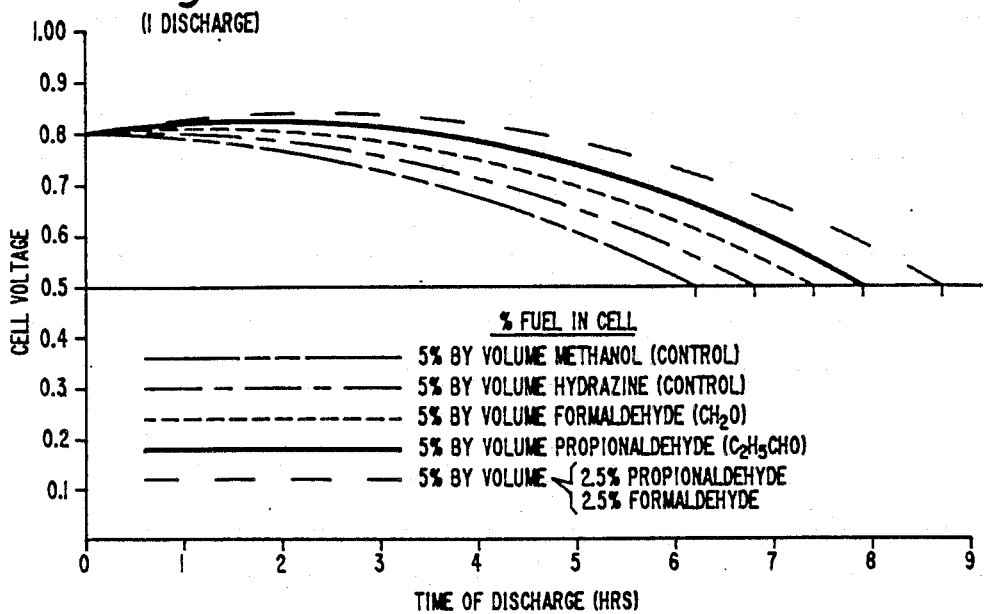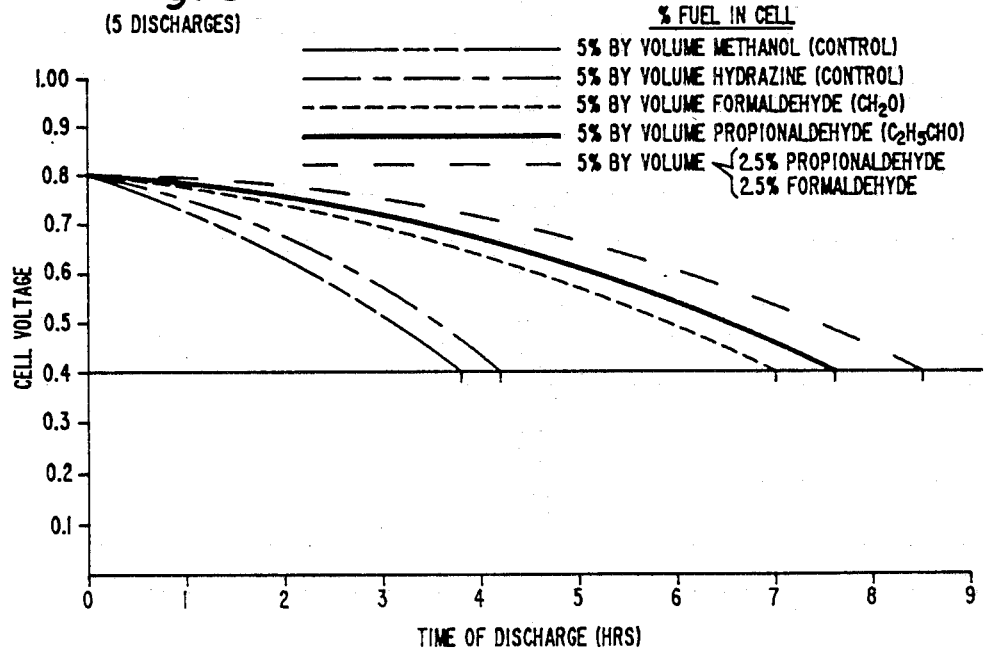

HYDROGEN-OXYGEN FUEL CELL AND METHOD FOR GENERATING ELECTRICITY IN SAID FUEL CELL

This invention relates to a hydrogen-oxygen fuel cell and an improved method for generating electricity in the hydrogen-oxygen fuel cell and more particularly is concerned with a novel fuel mixture which, when employed as the fuel in the hydrogen-oxygen fuel cell, provides a higher output of electrical power over a longer period of time and also reduces the required maintenance of the hydrogen-oxygen fuel cell in comparison with conventional fuels.

BACKGROUND OF THE INVENTION

A hydrogen-oxygen fuel cell is an apparatus which converts the energy of the chemical reactions between a fuel and an oxidant directly into low voltage, direct current electricity. Typical hydrogen-oxygen fuel cells are comprised of an electrolyte chamber which contains an electrolyte, and a cathode and an anode which are positioned in a spaced-apart relationship from each other in the electrolyte. The cathode and anode are made of a catalytic material which causes the fuel and the oxidant to react at a sufficiently high rate of reaction to produce useful amounts of electrical power.

In operation, a fuel is fed to the anode where it is oxidized in the electrolyte at the catalytic surface of the anode causing the liberation of electrons. Simultaneously, an oxidant is fed to the cathode where it is reduced in the electrolyte at the catalytic surface of the cathode causing consumption of electrons. The electrons generated at the anode are conducted to the cathode through a conductor which is attached to the cathode and anode. The transfer of electrons from the anode to the cathode causes an electrical current to flow which can be used to operate electrical devices.

The oxidant which is used in the operation of a hydrogen-oxygen fuel cell can be pure oxygen but more typically is an inexpensive, readily-available, oxygen-containing gas such as air.

The fuel used in the operation of hydrogen-oxygen fuel cells can be pure hydrogen but more typically is a material which can be reduced to provide hydrogen. Fuels other than hydrogen which are commonly employed include hydrazine ($N_2H_4$) and organic compounds such as formaldehyde, ethanol, methanol, propylene, methane and the like.

Hydrogen-oxygen fuel cells have many inherent advantages over other types of apparatus used to produce electricity. The manufacturing cost of hydrogen-oxygen fuel cells is quite low and there are no mechanically moving parts. Hydrogen-oxygen fuel cells are noiseless, clean and the by-products are unobjectionable. Hydrogen-oxygen fuel cells consume fuel only when power is drawn from the system. After the electrical power is drawn off, the cell can be rejuvenated by simply adding additional fuel and oxidant.

The production of electricity using a hydrogen-oxygen fuel cell as described above is well known in the art. Much research work has been conducted to overcome certain problems encountered with hydrogen-oxygen fuel cells with, at best, limited success. Recently, the research work on hydrogen-oxygen fuel cells has intensified because of use of hydrogen-oxygen fuel cells on space vehicles. In normal operation, space vehicles rely on solar cells to produce required electrical power. However, when the solar cells are shielded from the sun, a backup power source must be used to provide the required electrical power. Because of their simplicity of construction and operation, hydrogen-oxygen fuel cells are considered to be an ideal alternate source of electrical power for space vehicles.

Certain problems have, however, been encountered. One such problem is that the amount of electrical power produced is relatively low and can only be produced for a relatively short period of time. A still further problem is that as the hydrogen-oxygen fuel cells are operated, certain by-products are produced as a result of the chemical reactions which occur. The principal by-products are water and carbonates. The by-product water rapidly dilutes the electrolyte which increases the internal resistance of the hydrogen-oxygen fuel cell and reduces the rate of chemical reaction such that the amount of useful electrical power which is produced in a given time period is substantially reduced. When the electrolyte becomes excessively diluted or contaminated with carbonates, it is necessary to discard the diluted and/or contaminated electrolyte and refill the hydrogen-oxygen fuel cell with fresh concentrated electrolyte.

What would be highly desirable would be a hydrogen-oxygen fuel cell and a method for operating the hydrogen-oxygen fuel cell which would allow the generation of larger amounts of electrical power for longer periods of time and which would not require frequent changes of electroyte in the hydrogen-oxygen fuel cell in order to maintain satisfactory performance.

SUMMARY OF THE INVENTION

A hydrogen-oxygen fuel cell is provided which includes as the fuel a mixture comprised of about 40 to 60% by volume of formaldehyde and about 60 to 40% by volume of propionaldehyde. The operation of hydrogen-oxygen fuel cells is improved with regard to the amount of electrical power produced, the length of time of operation between discharges of the hydrogen-oxygen fuel cell and the number of times the hydrogen-oxygen fuel cell can be rejuvenated before replacement of electrolyte.

BRIEF DESCRIPTION OF THE DRAWING

FIG. 2 is a graphic illustration showing the results obtained with a hydrogen-oxygen fuel cell using different fuels during the initial discharge cycle.

FIG. 3 is a graphic illustration corresponding to FIG. 2, showing the results obtained with a hydrogen-oxygen fuel cell after five cycles.

DETAILED DESCRIPTION OF THE INVENTION

Figure 1:
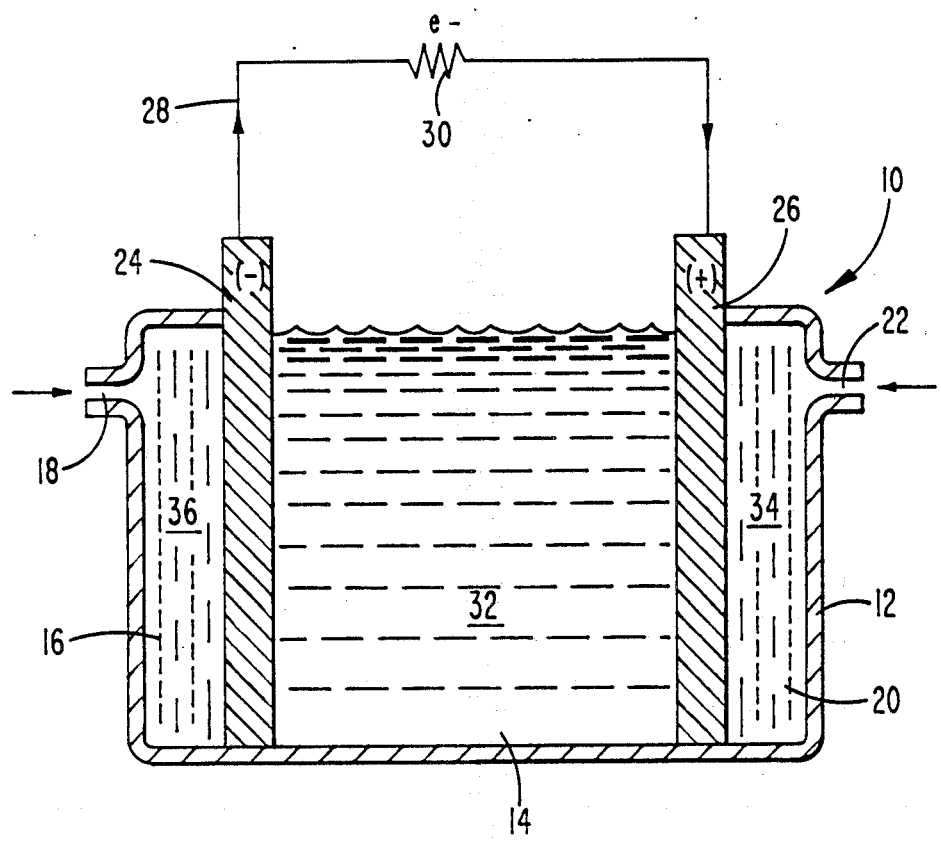
FIG. 1 is a schematic illustration of a hydrogen-oxygen fuel cell.

The hydrogen-oxygen fuel cell 10 of this invention is schematically illustrated in FIG. 1. The hydrogen-oxygen fuel cell 10 is conventional with regard to its structural components. The component of the hydrogen-fuel cell 10 includes a housing 12 which has an electrolyte chamber 14 in the center portion, a fuel chamber 16 including a loading port 18 at one end of the electrolyte chamber 14 and a oxidant chamber 20 including a loading port 22 at the opposite end of the electrolyte chamber 14. An anode 24 made of a catalytic material is positioned between the fuel chamber 16 and the electrolyte chamber 14. A cathode 26 made of a catalytic material is positioned between the oxidant chamber 20 and the electrolyte chamber 14. An electrical conductor 28 is shown connected between the anode 24 and the cathode 26 externally of the electrolyte chamber 14. A device 30, shown for purpose of illustration as a resistor, can be placed in line with the conductor 28.

In accordance with the present invention, the hydrogen-oxygen fuel cell 10 is completed by providing a supply of electrolyte 32 in electrolyte chamber 14, and a supply of oxidant 34 in the oxidant chamber 20, and a supply of fuel 36, namely, a mixture of formaldehyde and propionaldehyde, in the fuel chamber 16.

In accordance with the present invention, a mixture comprised of about 40 to 60% by volume of formaldehyde (HCHO) and about 60 to 40% by volume of propionaldehyde ($CH_3CH_2CHO$), preferably about 50% by volume of formaldehyde and about 50% by volume of propionaldehyde, is used as the fuel 36 in the hydrogen-oxygen fuel cell 10.

In describing the relative volume of the components which comprise the fuel mixture of this invention, it should be appreciated that the volumes set forth are those obtained at a pressure of 760 mm of mercury and a temperature of 25° C. It is possible within the scope of this invention to use volumes of materials required to make the fuel mixture of this invention at higher or lower pressures and higher or lower temperatures if appropriate adjustments are made to compensate for the change in relative volumes caused by changes in the pressure and/or temperature so as to keep the relative proportions of material the same as that obtained at 760 mm and 25° C.

Furthermore, while the optimum results with regard to both the predictability of operation and performance are obtained with pure formaldehyde and propionaldehyde, the components which comprise the fuel composition of this invention can contain relatively large amounts of impurities which do not significantly adversely affect the use of the mixture of this invention as a fuel in a hydrogen-oxygen fuel cell. For example, it is possible to tolerate certain common contaminates, such as small amounts of water or methanol and the like, without unduly affecting the performance of the hydrogen-oxygen fuel cell. It should be appreciated, however, that the presence of these impurities, such as water, can have an adverse affect with regard to the overall performance of the hydrogen-oxygen fuel cell as will be indicated below.

The electrolytes used in the method of this invention are conventional with, for example, an about 30% aqueous solution of potassium hydroxide being especially suitable for use as the electrolyte.

In use, the fuel mixture of this invention can be combined prior to introduction into the fuel chamber 16. It is, however, considered preferable from a handling standpoint and for purposes of controlling the relative volumes of material to separately meter each of the components, that is, the formaldehyde and propionaldehyde, into the fuel chamber 16 of the hydrogen-oxygen fuel cell 10.

The amount of fuel mixture of this invention which is added to the hydrogen-oxygen fuel cell 10 should constitute between 5 and 10 percent by volume of the total volume of the fuel mixture and the electrolyte which is between the anode 24 and the cathode 26 of the hydrogen-oxygen fuel cell 10. When the hydrogen-oxygen fuel cell 10 contains the above-noted amount of a fuel mixture it is considered charged and ready for operation. As electrical power is required, the fuel mixture is oxidized at the anode. When all or substantially all of the fuel in the electrolyte is consumed, the hydrogen-oxygen fuel cell is considered to be discharged. The consumption of the amount of fuel required to fully charge a cell is considered to be one cycle for purposes of determining for how many cycles the hydrogen-oxygen fuel cell can be operated before it is necessary to replace contaminated electrolyte with fresh electrolyte. The fuel mixture can, however, be fed continuously into the hydrogen-oxygen fuel cell to replace the fuel as it is consumed so as not to allow the hydrogen-oxygen fuel cell to become fully discharged.

The fuel mixture of this invention and the use of it in the method of this invention results in a number of highly unexpected advantages as compared to using the fuels heretofore commonly employed in hydrogen-oxygen fuel cells. It was found using identical hydrogen-oxygen fuel cells, except for the fuel, identical reaction temperatures (25° C.) and the same starting electrolyte (31% potassium hydroxide) that the fuel mixture of this invention produced substantially more electrical power over a longer period of time than that obtainable with methanol, hydrazine, formaldehyde or propionaldehyde when used alone as a fuel. Surprisingly, on an equal volume basis, the mixture of formaldehyde and propionaldehyde was found to be clearly superior to the properties of either formaldehyde or propionaldehyde when used alone as a fuel; that is, the mixture of formaldehyde and propionaldehyde is synergistic in its properties. In the chart below, there are listed the results obtained when the hydrogen-oxygen fuel cells were charged to 0.8 volt and were discharged to 0.5 volt using a 5% by volume and a 10% by volume concentration of fuel in the electrolyte. All of the cells were discharged uniformly by drawing 0.25 ampere at 25° C. The results obtained are shown in the chart below and the results for the 5% by volume concentrations are graphically illustrated in FIG. 1.

CHART

| | Fuel | Concentration in Electrolyte | Time of Discharge to 0.5 Volt/Cell |
|---|---|---|---|
| 1. | Methanol | 5% | 6 Hrs. 11 Min. |
| 2. | Hydrazine | 5% | 6 Hrs. 48 Min. |
| 3. | Formaldehyde | 5% | 7 Hrs. 22 Min. |
| 4. | Propionaldehyde | 5% | 7 Hrs. 54 Min. |
| 5. | 50% Formaldehyde / 50% Propionaldehyde | 5% | 8 Hrs. 40 Min. |
| 6. | Methanol | 10% | 9 Hrs. 6 Min. |
| 7. | Hydrazine | 10% | 9 Hrs. 51 Min. |
| 8. | Formaldehyde | 10% | 10 Hrs. 35 Min. |
| 9. | Propionaldehyde | 10% | 11 Hrs. 12 Min. |
| 10. | 50% Formaldehyde / 50% Propionaldehyde | 10% | 11 Hrs. 58 Min. |

It was further unexpectedly found that the hydrogen-oxygen fuel cell fueled with the formaldehyde-propionaldehyde mixture of this invention could be cycled considerably more times without a significant loss in effectiveness than the cells fueled with the other fuels. This was determined by cycling all the hydrogen-oxygen fuel cells which contained the 5% fuel concentration of fuel five times from a full charge of 0.8 volt to a half charge of 0.4 volt. As a result of this evaluation, it was found, as shown in FIG. 2, that the discharge time of the hydrogen-oxygen fuel cells fueled with either methanol or hydrazine had decreased significantly in discharge time; the hydrogen-oxygen fuel cells fueled with formaldehyde or propionaldehyde had a considerably less but still a definite decrease in discharge time and, surprisingly, the hydrogen-oxygen fuel cell fueled with a mixture of formaldehyde and propionaldehyde showed only a very slight decrease in discharge time.

The superior performance properties of the fuel cells of this invention makes them especially useful as hydrogen-oxygen fuel cells for space vehicles because considerably less weight of the fuel and electrolyte is required in order to produce the required amount of electricity to operate the space vehicle. The properties of the fuel cells of this invention also make them especially useful as hydrogen-oxygen fuel cells for use in remote locations because the required servicing of the hydrogen-oxygen fuel cells can be extended for substantially longer periods than when using conventional fuels.

What is claimed is:

1. In a hydrogen-oxygen fuel cell containing an electrolyte, an anode and a cathode immersed in said electrolyte in a spaced-apart relationship, a supply of fuel in communication with the anode and a supply of oxidant in communication with the cathode, the improvement which comprises said fuel being a mixture comprised of about 40 to 60% by volume of formaldehyde and about 60 to 40% by volume of propionaldehyde.

2. The fuel cell according to claim 1 wherein said fuel is comprised of about 50% by volume of formaldehyde and about 50% by volume of propionaldehyde.

3. The fuel cell according to claim 1 wherein said supply of fuel is present in said fuel cell at the start of the discharge cycle in an amount of about 5 to 10% by volume based on the total volume of the fuel and the electrolyte between the cathode and the anode.

4. In the method for operating a hydrogen-oxygen fuel cell having an electrolyte chamber, a cathode and an anode immersed in said electrolyte in a spaced-apart relationship wherein a fuel is supplied to the anode and an oxidant is supplied to the cathode, the improvement which comprises employing as the fuel a mixture comprised of about 40 to 60% by volume of formaldehyde and about 60 to 40% by volume of propionaldehyde.

5. The method according to claim 4 wherein said fuel is comprised of about 50% by volume of formaldehyde and about 50% by volume of propionaldehyde.

6. The method according to claim 4 wherein the fuel is supplied to said fuel cell at the start of a discharge cycle in the amount of about 5 to 10% by volume based on the total volume of the fuel and the electrolyte between the anode and cathode.

* * * * *